(12) United States Patent
Farrugia et al.

(10) Patent No.: US 8,997,044 B2
(45) Date of Patent: Mar. 31, 2015

(54) OVERRIDING SYSTEM ATTRIBUTES AND FUNCTION RETURNS IN A SOFTWARE SUBSYSTEM

(71) Applicant: International Business Machines Corporation, Armonk, NY (US)

(72) Inventors: John Farrugia, Austin, TX (US); Michael J. Jones, Cedar Park, TX (US); David Dean Sanner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/690,442

(22) Filed: Nov. 30, 2012

(65) Prior Publication Data

US 2014/0157234 A1    Jun. 5, 2014

(51) Int. Cl.
| | |
|---|---|
| G06F 15/16 | (2006.01) |
| G06F 12/00 | (2006.01) |
| G06F 9/00 | (2006.01) |
| G06F 9/24 | (2006.01) |
| G06F 9/44 | (2006.01) |
| G06F 9/445 | (2006.01) |
| G06F 9/46 | (2006.01) |
| G06F 11/36 | (2006.01) |

(52) U.S. Cl.
CPC .............. *G06F 8/70* (2013.01); *G06F 11/3672* (2013.01); *G06F 9/44505* (2013.01)
USPC ........... 717/120; 702/186; 709/231; 711/103; 713/1; 717/106; 717/168; 717/169; 717/170; 717/174; 718/108

(58) Field of Classification Search
CPC ... G06F 8/65; G06F 11/1068; G06F 11/1417; G06F 11/1433; G06F 21/572; G06F 9/4401; G06F 9/445; G06F 21/6245; G06F 9/44505; G06F 9/4443; G06F 8/34; G06F 8/35; G06F 8/38; G06F 8/60
See application file for complete search history.

(56) References Cited

U.S. PATENT DOCUMENTS

| | | | |
|---|---|---|---|
| 5,740,370 A | 4/1998 | Battersby et al. ........ | 395/200.49 |
| 6,128,730 A * | 10/2000 | Levine ......................... | 718/108 |
| 6,321,230 B1 | 11/2001 | Joslin et al. .................. | 707/100 |
| 6,629,316 B1 * | 9/2003 | Curtis .......................... | 717/174 |
| 6,823,414 B2 | 11/2004 | Radhakrishna .............. | 710/262 |
| 6,829,572 B2 | 12/2004 | Crouse, II et al. ............ | 713/15 |
| 7,277,825 B1 * | 10/2007 | Orfali et al. .................. | 702/186 |
| 7,548,986 B1 * | 6/2009 | Yang ............................ | 709/231 |
| 2007/0250694 A1 * | 10/2007 | Sinha et al. ...................... | 713/1 |
| 2007/0294319 A1 * | 12/2007 | Mankad et al. .............. | 707/204 |
| 2008/0126854 A1 * | 5/2008 | Anderson et al. ............. | 714/13 |
| 2009/0222650 A1 * | 9/2009 | Chen ............................ | 717/170 |

(Continued)

*Primary Examiner* — Don Wong
*Assistant Examiner* — Anibal Rivera
(74) *Attorney, Agent, or Firm* — VanLeeuwen & VanLeeuwen; Parashos Kalaitzis (57) ABSTRACT

An approach is provided in which a request is received from a software module to retrieve a value stored in a pre-defined location. Prior to retrieving the value, an override tank is checked for a corresponding override value. When the override tank includes an override value, the override value in the override tank is provided to the software module. When the override tank fails to include a corresponding override value, an actual value is retrieved from a pre-defined storage location and provided to the software module. In one embodiment, the override value is an override system attribute value. In another embodiment, the override value is an override function return value.

13 Claims, 10 Drawing Sheets

(56) References Cited

U.S. PATENT DOCUMENTS

| | | | |
|---|---|---|---|
| 2009/0276768 A1* | 11/2009 | Fedok et al. | 717/169 |
| 2010/0235826 A1* | 9/2010 | Garcia et al. | 717/173 |
| 2010/0299662 A1 | 11/2010 | Chilimbi et al. | 717/170 |
| 2011/0197185 A1* | 8/2011 | Hobbet et al. | 717/168 |
| 2011/0265061 A1* | 10/2011 | Moore | 717/106 |
| 2013/0282957 A1* | 10/2013 | Mylly | 711/103 |
| 2014/0007069 A1* | 1/2014 | Cavalaris et al. | 717/170 |

* cited by examiner

ATTR_GET
150

```
int ATTR_GET(AttrId i_id, int & o_val)
{
    if (theOverrideAttrTank.getOverride(i_id, o_val))    /— 300
    {
        // Override value was returned
        return SUCCESS;
    }
                                                         /— 310
    // Get the attribute from a predefined location. The ATTR_GET_PLATFORM
    // function knows where each attribute resides
    return ATTR_GET_PLATFORM(i_id, o_val)
}
```

*FIG. 3A*

ATTR_SET
180

```
int ATTR_SET(AttrId i_id, int & i_val)
{
    theOverrideAttrTank.clearNonConstOverride(i_id);     /— 320

// Set the attribute in a predefined location. The ATTR_SET_PLATFORM
    // function knows where each attribute resides
    return ATTR_SET_PLATFORM(i_id, i_val)
}
```

*FIG. 3B*

FUNC_A
    200

```
// This function takes an input value, performs a calculation and returns the result
int FUNCTION_X(int i_inputVal)
{
    int l_returnValue = 0;

if (ATTR_GET(OVERRIDE_ATTR_FUNCTION_X_ID, l_returnValue) == SUCCESS)
    {
        // There is an override and it is loaded into l_returnValue
    }
    else
    {
        // Do the function's business logic of calculating and returning a value
        l_returnValue = i_inputVal * 5 + 7;
    }
    return l_returnValue;
}
```

Code 400

OVERRIDING SYSTEM ATTRIBUTES AND FUNCTION RETURNS IN A SOFTWARE SUBSYSTEM

BACKGROUND

The present disclosure relates to overriding system attributes and function returns in a software subsystem. More particularly, the present disclosure allows software macros to check an override tank for override values, which are added by a developer, prior to retrieving values from pre-defined locations.

Many different types of software modules query system attributes, which is information that is implicitly unknown by the software modules yet required by the software modules in order to operate correctly. Software modules such as those that initialize a device may require information pertaining to the device's input clock frequency, the number of buses attached to the device, the product name of the device, and the engineering level of the device. Software modules such as those that initialize a memory module may require information pertaining to the number of memory banks, the CAS latency, the number of rows/columns in memory, and bad pin locations. Software modules such as those that display graphics/text may require information pertaining to the screen resolution and the language of user.

Other software modules may execute function macros to provide values back to the software modules such as retrieving data from a memory location, computing values based upon retrieved data, and/or other computational tasks.

BRIEF SUMMARY

An approach is provided in which a request is received from a software module to retrieve a value stored in a pre-defined location. Prior to retrieving the value, an override tank is checked for a corresponding override value. When the override tank includes an override value, the override value in the override tank is provided to the software module. When the override tank fails to include a corresponding override value, an actual value is retrieved from a pre-defined storage location and provided to the software module. In one embodiment, the override value is an override system attribute value. In another embodiment, the override value is an override function return value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
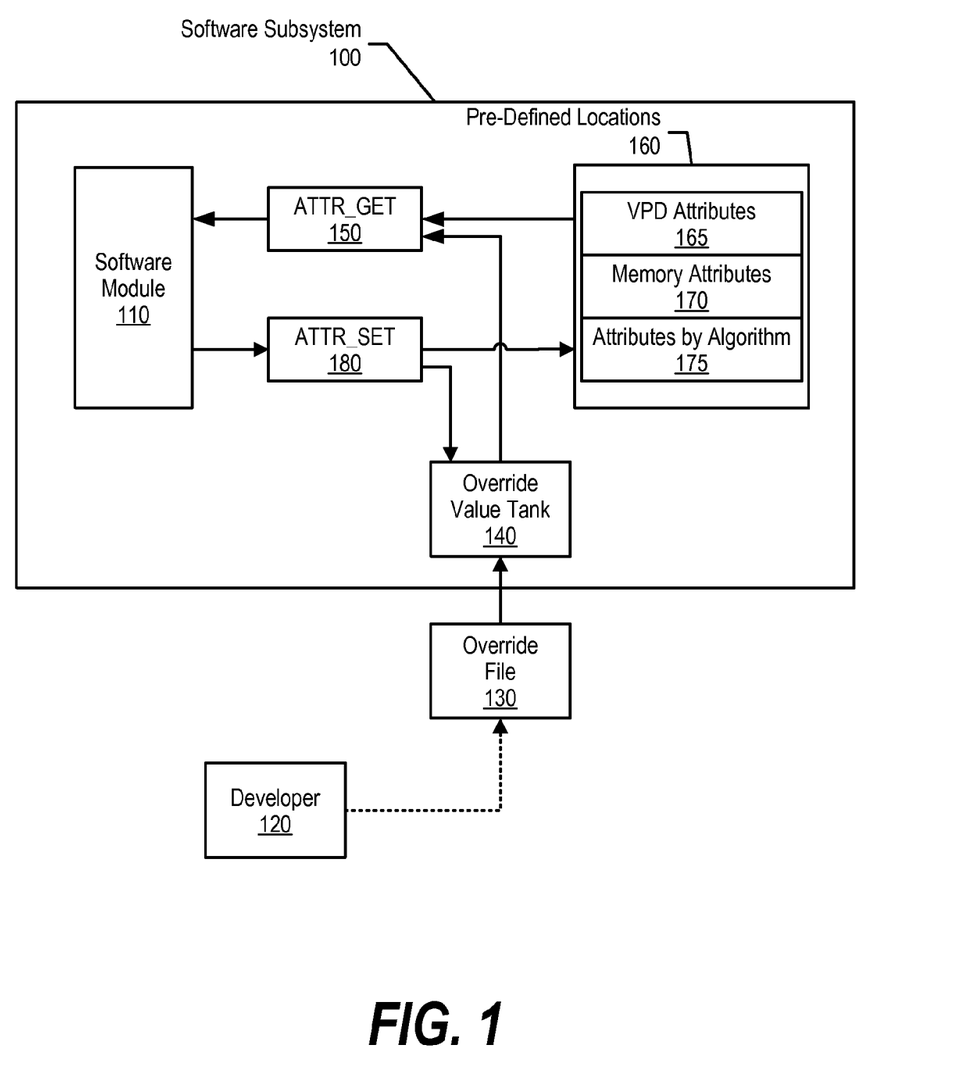
FIG. 1 depicts a software subsystem including an override value tank accessible by attribute get macros and attribute set macros.

FIG. 1 is a diagram showing a software subsystem including an override value tank accessible by attribute get macros and attribute set macros. During development and product test, a developer may wish to override system attributes so that a software module receives a specified value when requesting the system attribute. This allows a developer to test different code paths or allows the developer to work around a problem. For example, in the case of a software module initializing a memory module, if a particular memory module claims that it supports a column address strobe (CAS) latency of 4, the developer may wish to change this value to 5 in order to determine whether the change in latency fixes a problem.

In addition, a developer may wish to specify that an override value is constant (CONST), indicating that the override value is returned to the software module, even if the attribute value is subsequently changed (ATTR_SET). Conversely, the developer may wish to specify an override is not constant (NON-CONST), indicating that the override value is returned to the software module until the attribute is subsequently changed.

Software subsystem 100 includes software module 110, which utilizes function ATTR_GET 150 to retrieve system attribute values from predefined locations 160. Pre-defined locations 160 includes vital product data (VPD) attribute location 165, memory attribute location 170 and attributes that are algorithm generated attribute location 175. VPD attribute location 165 may include information such as CAS Latency, a number of rows, and/or a number of banks. Memory attribute location 170 may include information such as the functional state of the hardware component, the product name of the hardware component, and/or the position of the hardware component with respect to similar components. Algorithm generated attribute location 175 may include information such as the base address register setting (calculated from chip position) and/or the total memory attached to a device (calculated from total memory attached to each memory buffer chip attached to a processor).

When ATTR_GET 150 receives a request from software module 110 to retrieve a system attribute value from one of pre-defined locations 160, ATTR_GET 150 first checks override value tank 140 (e.g., located in firmware memory) for a corresponding override system attribute value. Override value tank 140 includes override system attribute values (binary data structure format) that are generated from override file 130 (file system text) written by developer 120 (see FIGS. 5A, 5B, and corresponding text for further details). If override value tank 140 has a corresponding override system attribute value, ATTR_GET 150 retrieves the override system attribute value from override value tank 140 and provides it to software module 110. Otherwise, ATTR_GET 150 accesses one of pre-defined locations 160 to retrieve the system attribute value requested by system module 110 (see FIG. 6 and corresponding text for further details).

Software module 110 utilizes function ATTR_SET 180 to set system attribute values in pre-defined locations 160. When ATTR_SET 180 receives a request from software module 110 to set a system attribute value in one of pre-defined locations 160, ATTR_SET 150 checks override value tank 140 to see if an override system attribute value exists that corresponds the request. In one embodiment, override value tank 140 may include "CONST" and/or "NON-CONST" system attribute types. In this embodiment, ATTR_SET 180 checks for NON-CONST system attribute types (because CONST system attribute types remain constant). If there is a NON-CONST system attribute type, ATTR_SET 180 clears the NON-CONST system attribute value accordingly. ATTR_SET 180 also changes the actual system attribute value included in one of pre-defined locations 160 based upon the request from system module 110 (see FIG. 7 and corresponding text for further details).

Figure 2:
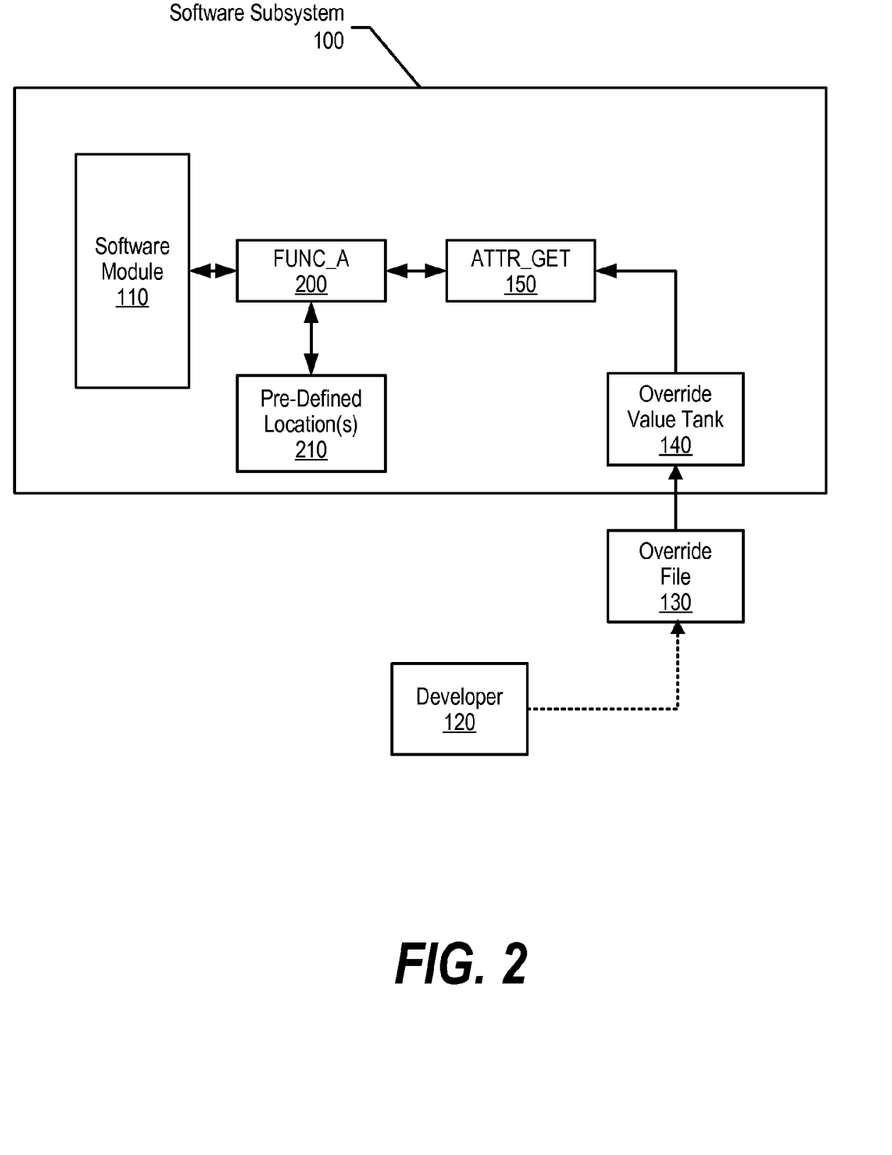
FIG. 2 depicts a function macro requesting an attribute get macro to check for an override function value in an override value tank.

FIG. 2 is a diagram showing a function macro requesting an attribute get macro to check for an override function value in an override value tank. Software subsystem 100 includes FUNC_A 200, which software module 110 utilizes to retrieve function values. For simplicity of implementation purposes, the approached discussed herein changes code within FUNC_A 200 to query ATTR_GET 150 instead of changing each location within software module 110 that calls FUNC_A 200 (see FIG. 4 and corresponding text for further details).

When FUNC_A 200 receives a request from software module 110 to retrieve a function return value from one of pre-defined locations 210, FUNC_A 200 first sends a request to ATTR_GET 150. In turn, ATTR_GET 150 checks override value tank 140 for an override function return value corresponding to software module 110's request. If override value tank 140 has a corresponding override function return value, ATTR_GET 150 retrieves the override function return value and provides it to FUNC_A 200, which in turn provides it to software module 110. When ATTR_GET 150 does not return a an override function return value, FUNC_A 200 accesses one of pre-defined locations 210 to retrieve (or compute) the actual function return value requested by system module 110 (see FIG. 8 and corresponding text for further details).

Figure 3A:
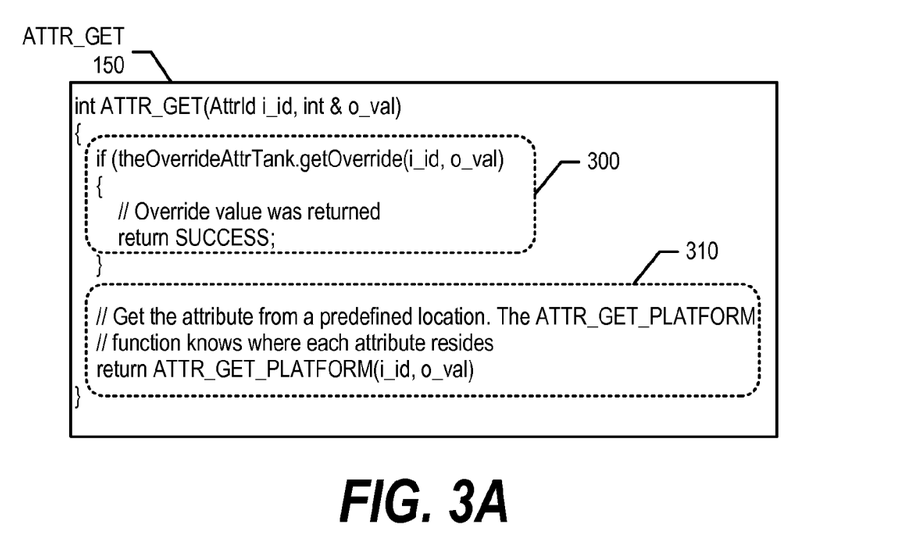
FIG. 3A is an exemplary diagram showing code for an ATTR_GET macro.

FIG. 3A is an exemplary diagram showing code for an ATTR_GET macro. Software module 110 calls ATTR_GET 150 to retrieve a system attribute from a pre-defined location. Prior to accessing the pre-defined location, ATTR_GET 150 macro checks override value tank 150 via lines 300 and, if an override system attribute is available, returns SUCCESS. The override system attribute value is returned in o_val and the getOverride function fills in the caller's o_val reference variable.

However, when override value tank 140 does not include a corresponding override system attribute value, lines 310 gets the actual system attribute value from one of pre-defined locations 160.

Figure 3B:
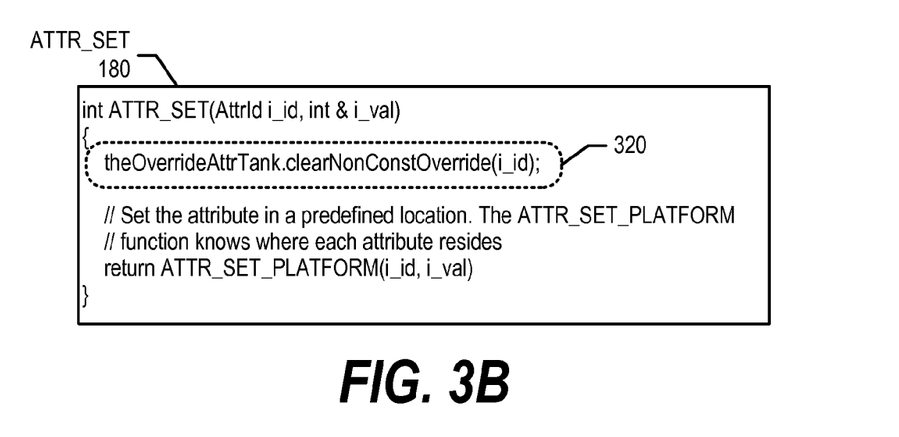
FIG. 3B is an exemplary diagram showing code for an ATTR_SET macro.

FIG. 3B is an exemplary diagram showing code for an ATTR_SET macro. Software module 110 calls ATTR_SET 180 to set a particular system attribute value. In addition to setting the system attribute value in one of pre-defined locations 210, lines 320 clear a non-constant system override value in override value tank 140 if one exists. Note that the constant (CONST) system override attributes remain unmodified and, in turn, will still be provided to system module 110 during an ATTR_GET request.

Figure 4:
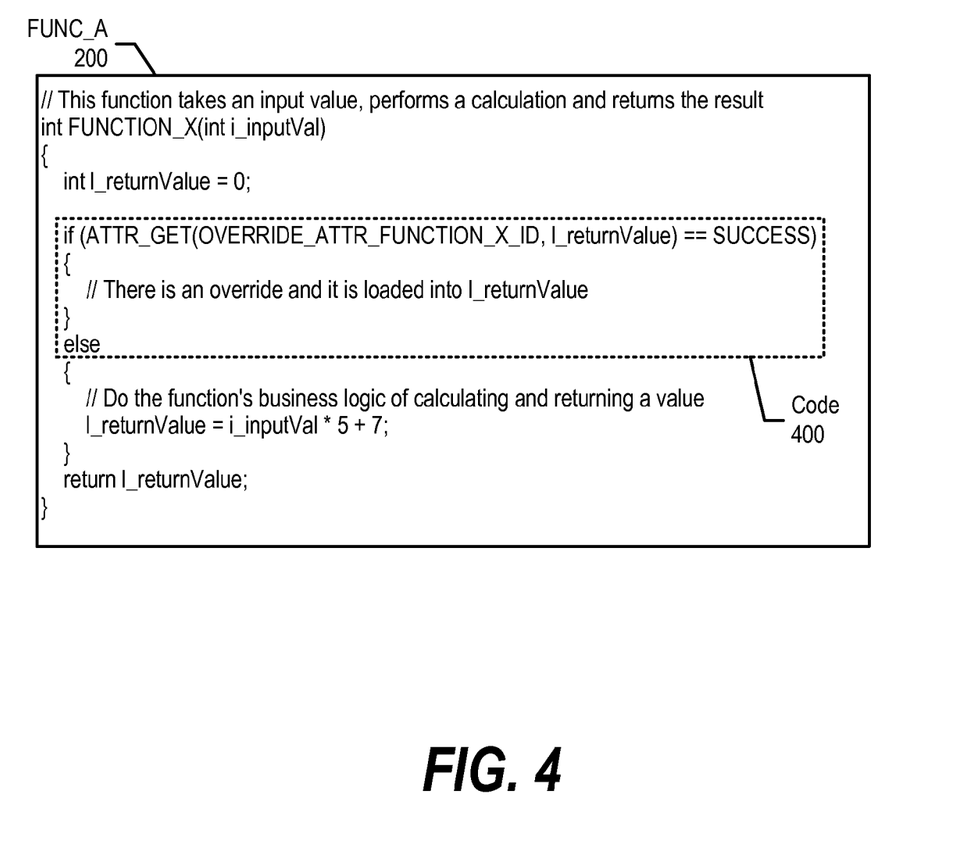
FIG. 4 is an exemplary diagram showing code added to a function macro.

FIG. 4 is an exemplary diagram showing code added to a function macro. Code 400 is added to FUNC_A 200 in order for FUNC_A 200 to call ATTR_GET 150 and check for an override function value in override value tank 140. By adding code 400 directly to FUNC_A 200, a software developer is not required to add the code throughout software module 110 where FUNC_A 200 is called. When ATTR_GET 150 does not return an override function return value, FUNC_A 200 retrieves (or computes) the actual function value from one of pre-defined locations 210.

Figure 5A:
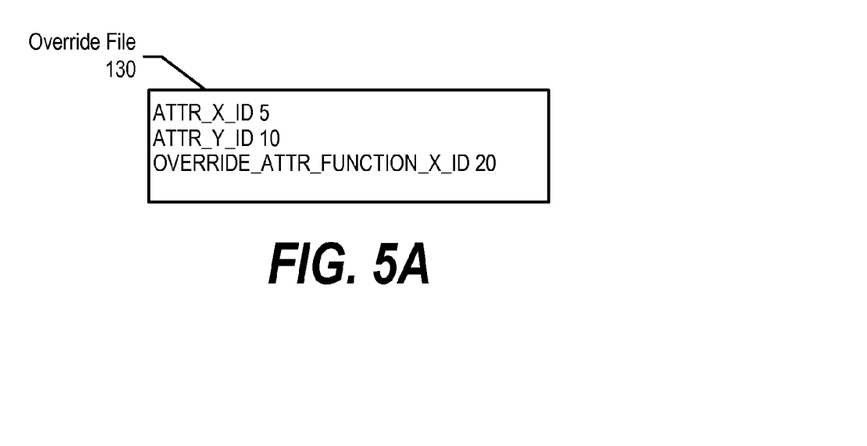
FIG. 5A is a diagram showing an override text file generated by a developer.

FIG. 5A is a diagram showing an override text file generated by a developer. Override file 130 includes override values for system attributes "X," "Y," and function "X". In one embodiment, override file 130 is a simple text file that is easily generated by the developer. In turn, override file 130 is utilized to generate an override value tank within a software subsystem's firmware (see FIG. 5 and corresponding text for further details).

Figure 5B:
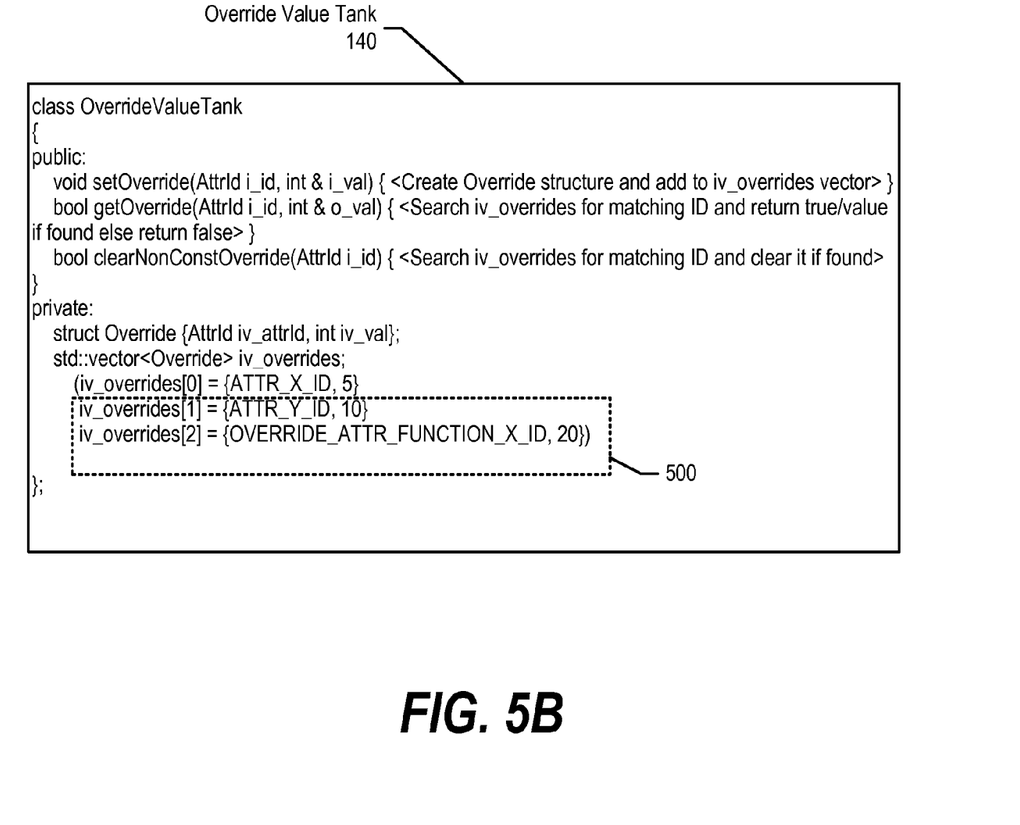
FIG. 5B is a diagram showing an override value tank that is store in a software subsystem's firmware.

FIG. 5B is a diagram showing a basic illustration of how an attribute tank may be constructed using a C++ class. Override value tank 140 includes private instance variables which are a list of attributes and public functions that set override values, get override values, and clear non-constant override values. Lines 500 include override values corresponding to the override values entered by a developer shown in override file 130 (shown in FIG. 5A).

Figure 6:
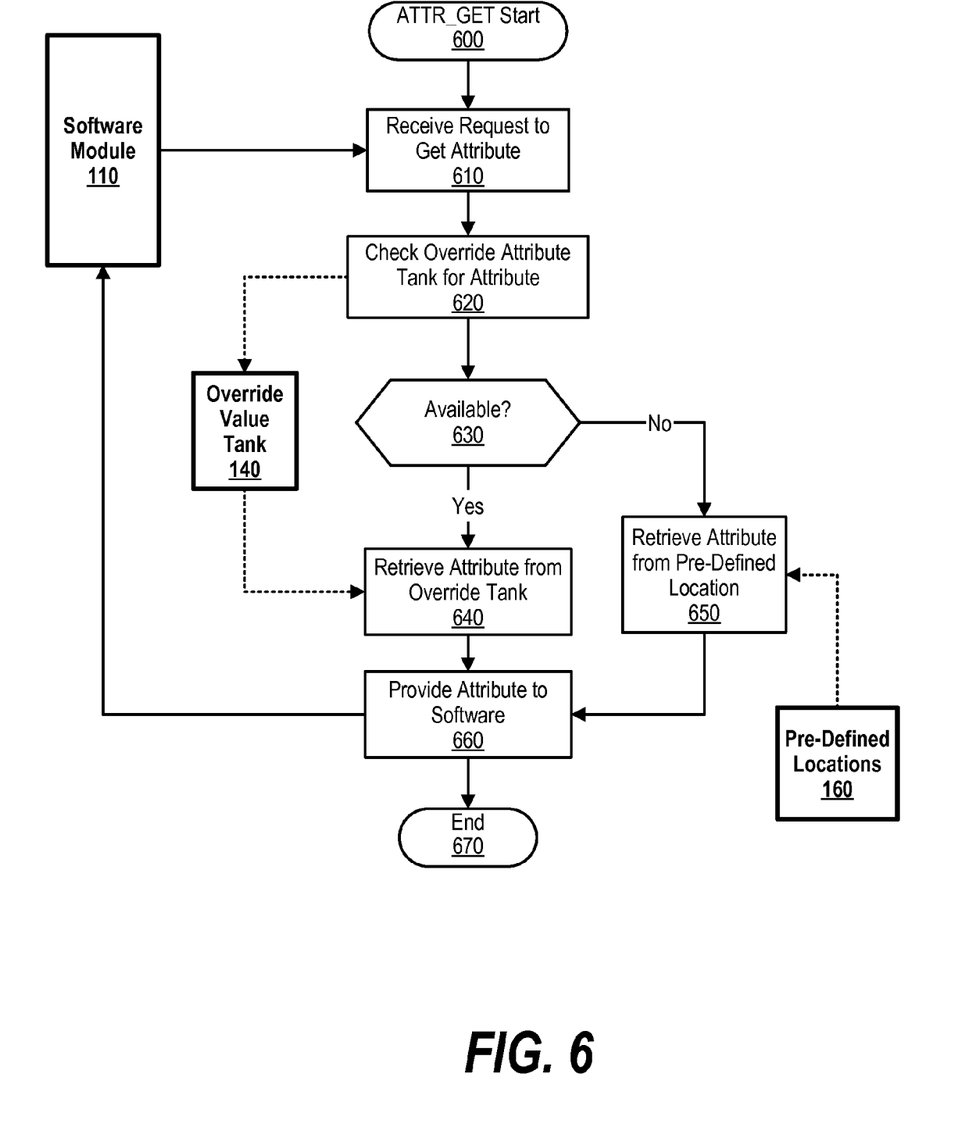
FIG. 6 is a flowchart showing steps taken in an ATTR_GET macro checking an override value tank for an override system attribute value prior to retrieving an actual system attribute value from a pre-defined storage location.

FIG. 6 is a flowchart showing steps taken in an ATTR_GET macro checking an override value tank for an override system attribute value prior to retrieving an actual system attribute value from a pre-defined storage location. Processing commences at 600, whereupon the ATTR_GET macro receives a request from software module 110 to get a system attribute value (indicated by an attribute identifier) from one of pre-defined locations 160 (step 610). At step 620, the ATTR_GET macro first checks override value tank 140 to see if an override system attribute value is available that corresponds to the attribute identifier.

If an override system attribute value is available that corresponds to the attribute identifier, decision 630 branches to the "Yes" branch, whereupon the ATTR_GET macro retrieves the override system attribute value from override value tank 140 (step 640) and provides the override system attribute value to software module 110 (step 660) and ends at 670.

On the other hand, if an override system attribute value is not located in override value tank 140 that corresponds to the attribute identifier, decision 630 branches to the "No" branch, whereupon the ATTR_GET macro retrieves an actual system attribute value from one of pre-defined locations 160 at step 650. In one embodiment, software subsystem 100's ATTR_GET platform knows where each actual system attribute value resides based upon the individual attribute identifier. The ATTR_GET macro provides the actual system attribute value to software module 110 at step 660 and ends at 670.

Figure 7:
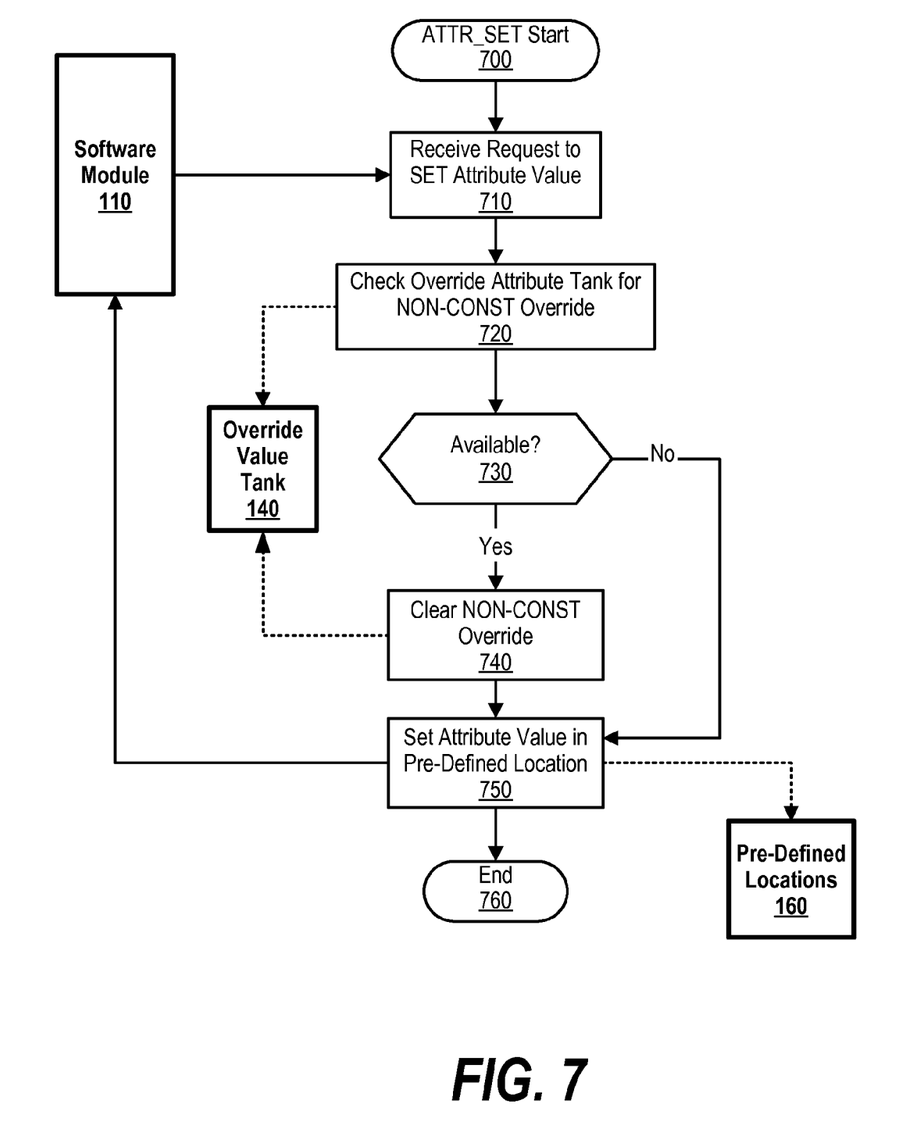
FIG. 7 is a flowchart showing steps taken in an ATTR_SET macro clearing non-constant override system attribute values located in an override value tank.

FIG. 7 is a flowchart showing steps taken in an ATTR_SET macro clearing non-constant override system attribute values located in an override value tank. Processing commences at 700, whereupon the ATTR_SET macro receives a request from software module 110 to set an actual system attribute value at one of pre-defined locations 160 (step 710).

At step 720, the ATTR_SET macro checks override value tank 140 to see if it includes a non-constant override system attribute value corresponding to the attribute identifier. If override value tank 140 includes a non-constant override system attribute value corresponding to the attribute identifier, decision 730 branches to the "Yes" branch, whereupon the ATTR_SET macro clears the corresponding non-constant override system attribute value (step 740). On the other hand, if override value tank 140 does not include a corresponding non-constant override system attribute value, decision 730 branches to the "No" branch.

At step 750, the ATTR_SET macro sets the actual system attribute value in one of pre-defined locations 160 according to software module 110's request, and ends at 760. In one embodiment, software subsystem 100's ATTR_SET platform knows where each actual system attribute value resides based upon the individual attribute identifiers.

Figure 8:
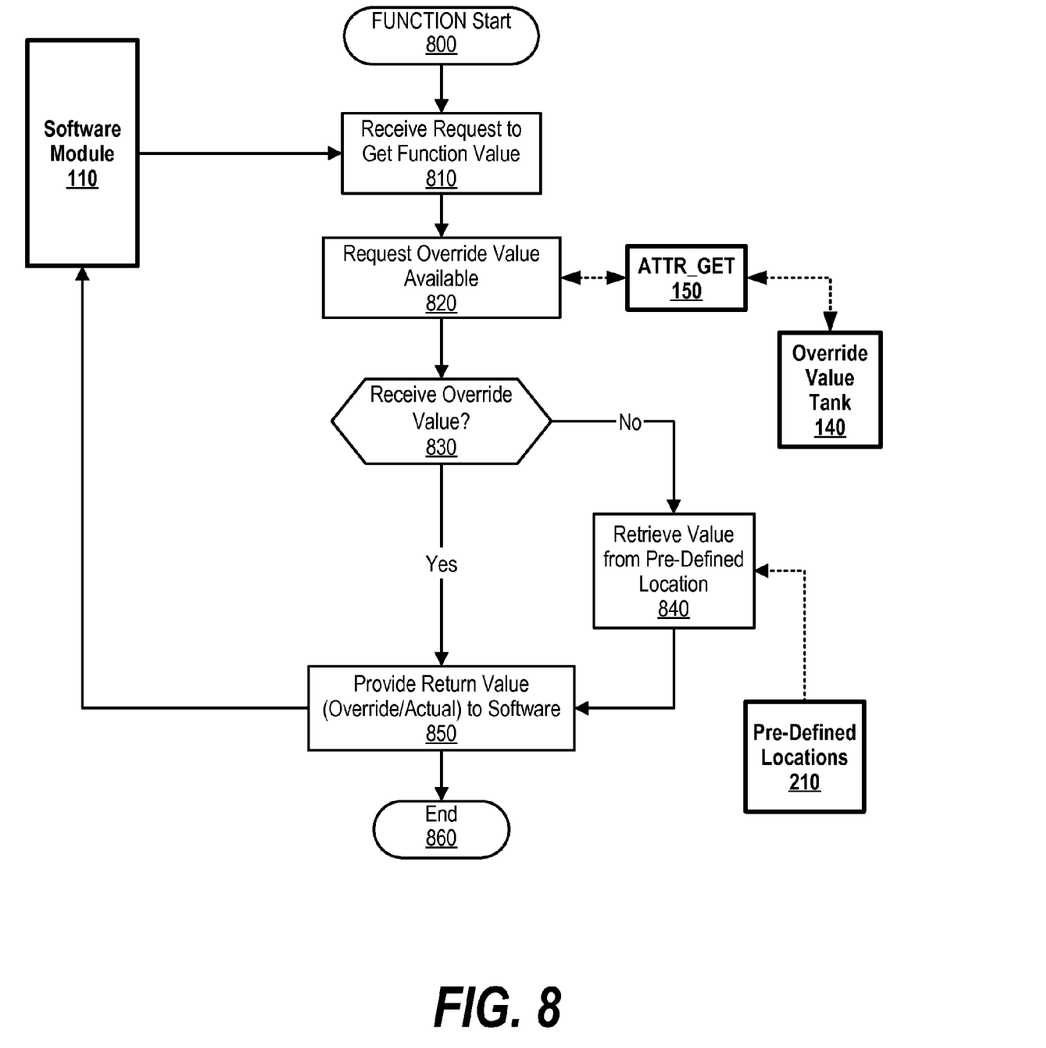
FIG. 8 is a flowchart showing steps taken in processing a function return request.

FIG. 8 is a flowchart showing steps taken in processing a function return request. Processing commences at 800, whereupon a function macro receives a request from software module 110 to retrieve an actual function return value from one of pre-defined locations 210 (step 810). At step 820, the function return macro sends a get request to ATTR_GET 150. ATTR_GET 150 is programmed to check override value tank 140 to see if an override function return value is available corresponding to the function return macro (see FIGS. 2, 6, and corresponding text for further details).

If ATTR_GET 150 returns an override function return value to the function macro, decision 830 branches to the "Yes" branch, whereupon the function return macro returns the override function return value to software module 110 at step 860.

On the other hand, if ATTR_GET 150 does not return an override function return value (e.g., one does not exist in override tank 140), decision 830 branches to the "No" branch, whereupon the function return macro retrieves (and/or computes) an actual function return value from one of pre-defined locations 210 at step 840, and provides the actual function return value to software module 110 at step 850. Processing ends at 860.

Figure 9:
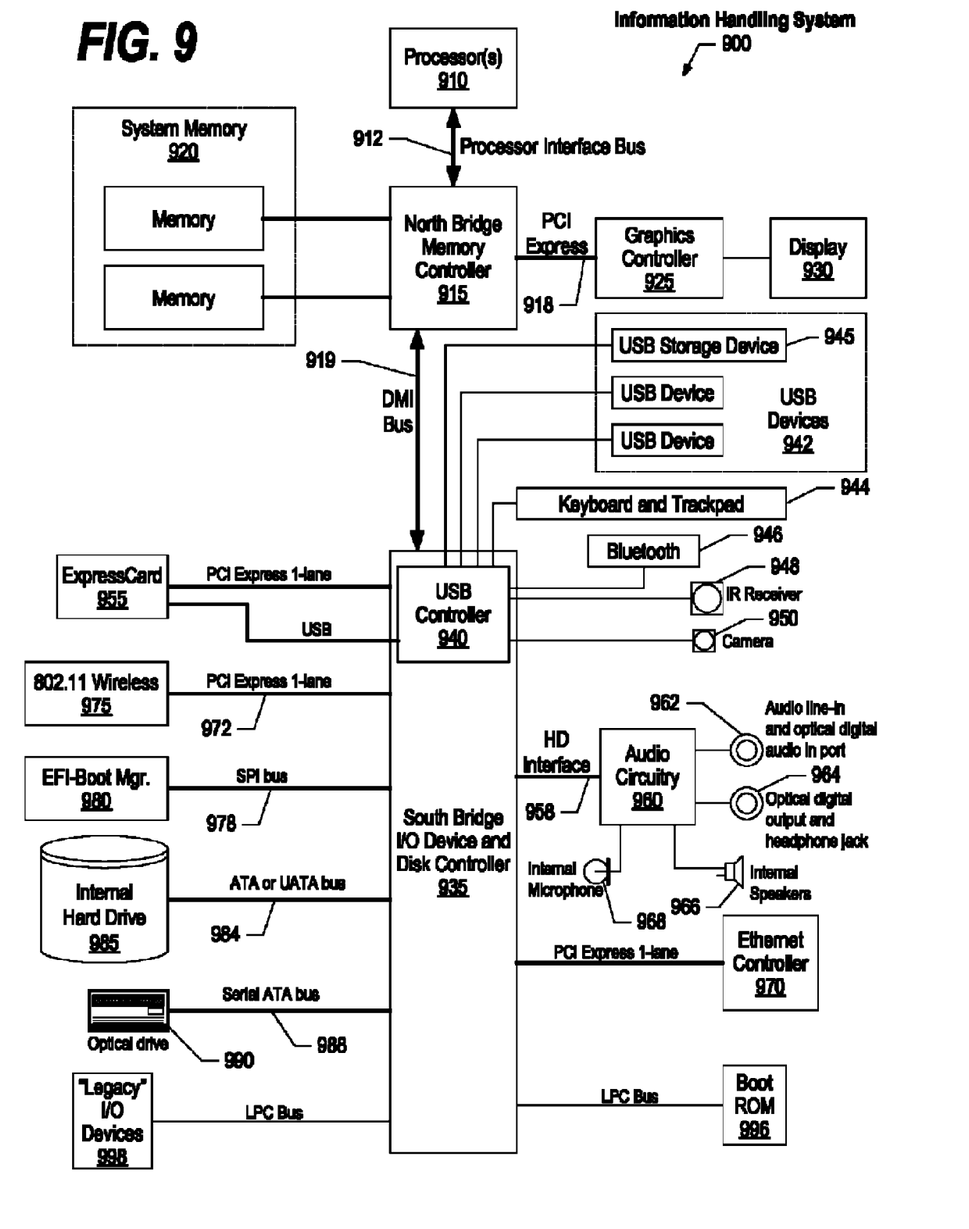
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 10:
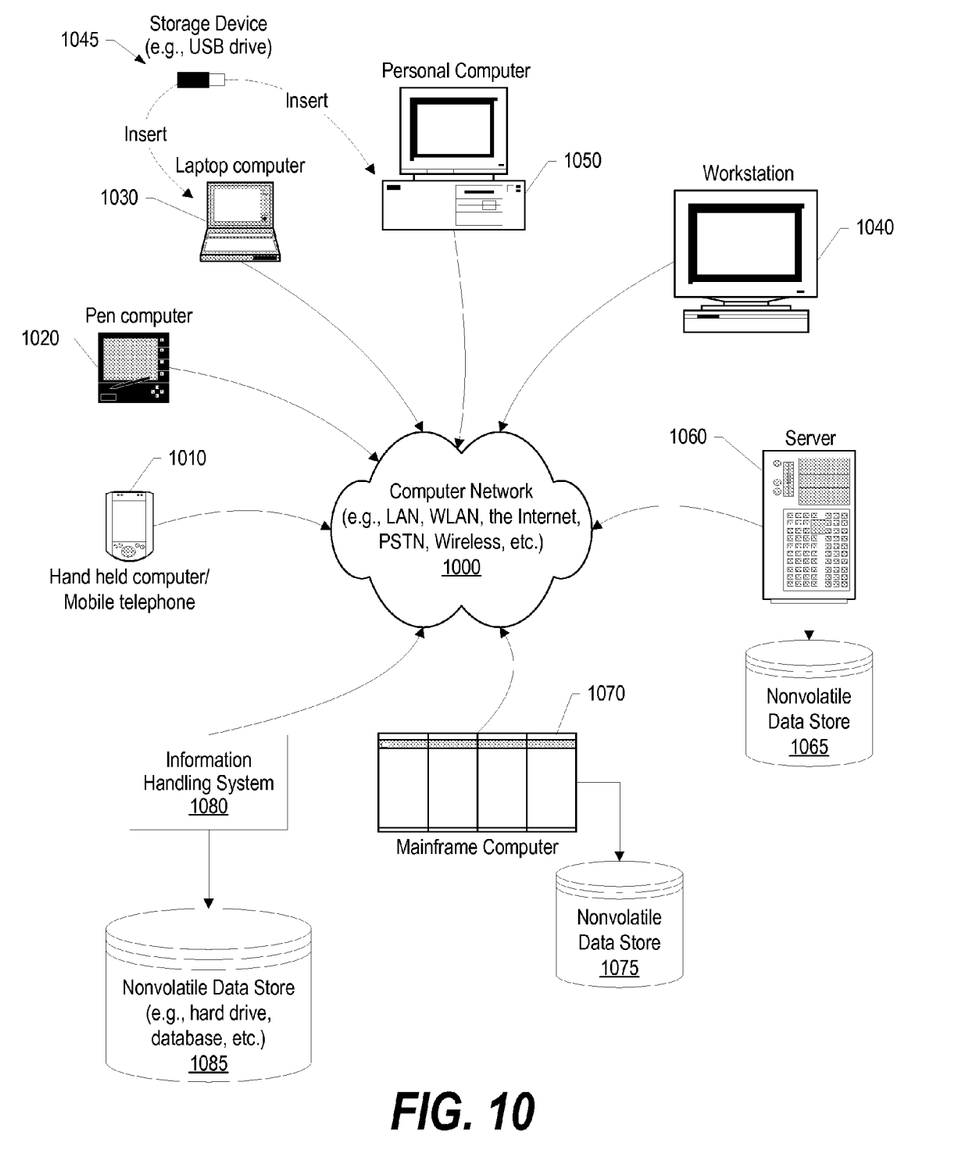
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors;
a set of computer program instructions stored in the memory and executed by at least one of the processors in order to perform actions of:
receiving a first request from a software module to retrieve a system attribute value stored in a first storage location;
determining whether an override system attribute value corresponding to the first request is available in a second storage location;
in response to determining that the override system attribute value is available:
retrieving the override system attribute value from the second storage location; and
providing the override system attribute value to the software module; and
in response to receiving a second request from the software module to change the system attribute value:
clearing the override system attribute value in the second storage location in response to determining that the override system attribute value is a non-constant override system attribute value; and
changing the system attribute value stored in the first storage location.

2. The information handling system of claim 1 wherein the processors perform additional actions comprising:
creating an override file based upon one or more override values received from a developer;
generating one or more override system attribute values according to the override file, wherein the override system attribute value is included in the one or more override system attribute values; and
storing the one or more override system attribute values in the second storage location.

3. The information handling system of claim 2 wherein the override file is a text file and the one or more system attribute values stored in the second storage location are binary data structures.

4. The information handling system of claim 1 wherein the system attribute value is implicitly unknown to the software module and the first storage location is a pre-defined storage location.

5. The information handling system of claim 4 wherein the first storage location is selected from the group consisting of a vital product data attribute location, a memory attribute location, and an algorithm generated attribute location.

6. A computer program product stored in a computer readable storage device, comprising computer program code that, when executed by an information handling system, causes the information handling system to perform actions comprising:
receiving a first request from a software module to retrieve a system attribute value stored in a first storage location;
determining whether an override system attribute value corresponding to the first request is available in a second storage location;

in response to determining that the override system attribute value is available:
  retrieving the override system attribute value from the second storage location; and
  providing the override system attribute value to the software module; and
in response to receiving a second request from the software module to change the system attribute value:
  clearing the override system attribute value in the second storage location in response to determining that the override system attribute value is a non-constant override system attribute value; and
  changing the system attribute value stored in the first storage location.

7. The computer program product of claim 6 wherein the information handling system performs additional actions comprising:
  creating an override file based upon one or more override values received from a developer;
  generating one or more override system attribute values according to the override file, wherein the override system attribute value is included in the one or more override system attribute values; and
  storing the one or more override system attribute values in the second storage location.

8. The computer program product of claim 7 wherein the override file is a text file and the one or more system attribute values stored in the second storage location are binary data structures.

9. The computer program product of claim 6 wherein the system attribute value is implicitly unknown to the software module and the first storage location is a pre-defined storage location.

10. An information handling system comprising:
  one or more processors;
  a memory coupled to at least one of the processors;
  a set of computer program instructions stored in the memory and executed by at least one of the processors in order to perform actions of:
    receiving a request from a software module to retrieve a function return value stored in a first storage location;
    determining whether an override function return value corresponding to the request is available in a second storage location;
    in response to determining that the override function return value is available:
      retrieving the override function return value from the second storage location; and
      providing the override function return value to the software module; and
    in response to determining that the override function return value fails to be available in the second storage location:
      retrieving the function return value from the first storage location; and
      providing the function return value to the software module.

11. The information handling system of claim 10 wherein the determining of whether the override function return value is available further comprises:
  sending a request to an attribute get macro, wherein the attribute get macro accesses the second storage area; and
  receiving a response from the attribute get macro that indicates whether the override function return value is available in the second storage area.

12. The information handling system of claim 11 further comprising:
  creating an override file based upon one or more override values received from a developer;
  generating one or more override function return values according to the override file, wherein the override function return value is included in the one or more override function return values; and
  storing the one or more override function return values in the second storage location.

13. The information handling system of claim 12 wherein the override file is a text file and the one or more system attribute values stored in the second storage location are binary data structures.

* * * * *